(12) United States Patent
Shahsavari et al.

(10) Patent No.: US 10,239,022 B2
(45) Date of Patent: Mar. 26, 2019

(54) POROUS CALCIUM-SILICATES AND METHOD OF SYNTHESIS

(71) Applicant: C-Crete Technologies LLC, Stafford, TX (US)

(72) Inventors: Rouzbeh Shahsavari, Houston, TX (US); Vahid Hejazi, Houston, TX (US)

(73) Assignee: C-Crete Technologies, LLC, Stafford, TX (US)

(*) Notice: Subject to any disclaimer, the term of this patent is extended or adjusted under 35 U.S.C. 154(b) by 30 days.

(21) Appl. No.: 15/144,811

(22) Filed: May 2, 2016

(65) Prior Publication Data
US 2017/0312702 A1 Nov. 2, 2017

(51) Int. Cl.
*B01D 53/22* (2006.01)
*B01D 67/00* (2006.01)
(Continued)

(52) U.S. Cl.
CPC ......... *B01D 71/027* (2013.01); *B01D 53/228* (2013.01); *B01D 67/0041* (2013.01);
(Continued)

(58) Field of Classification Search
CPC .............. B01D 53/228; B01D 67/0044; B01D 67/0046; B01D 67/0069; B01D 71/02;
(Continued)

(56) References Cited

U.S. PATENT DOCUMENTS

| | | | | |
|---|---|---|---|---|
| 4,395,357 A | * | 7/1983 | Kramer | B01D 53/28 119/171 |
| 2001/0042440 A1 | * | 11/2001 | Miyazawa | B01D 53/02 95/139 |

(Continued)

OTHER PUBLICATIONS

Xia, Wei et al., "Preparation and the phase transformation behavior of amorphous mesoporous calcium silicate", Microporous and Mesoporous Materials, 2008, 108, pp. 345-351. (Year: 2008).*

(Continued)

*Primary Examiner* — Jason M Greene
(74) *Attorney, Agent, or Firm* — Gregory L. Porter; Hunton Andrews Kurth LLP

(57) ABSTRACT

Mesoporous membranes have shown promising separation performance with a potential to lower the energy consumption, leading to a dramatic cost reduction. Recently, an extensive effort has been made on the design of membranes which brought a significant progress toward the synthesis of well-defined porous morphologies, most of which synthesized by surfactant-template methodology. Currently, the most well-designed state-of-the-art membranes using this technique are made from metals, polymers, carbon, silica, etc. In the present invention, we demonstrate mesoporous calcium-silicate particles having superior separation capacity and optimal permeability, thereby leading to reduced energy consumption for selective separation of gases/liquids and/or the combination thereof. We explore various methods to improve the calcium-silicate membranes properties by tuning pore density during the synthesis/aging process, while favoring the formation of uniformly distributed nanopores. Lowering particle density by controlling calcium to silicon ratio along with optimizing the surface area are essential in achieving our objective.

19 Claims, 6 Drawing Sheets

(51) Int. Cl.
| | |
|---|---|
| B01D 69/10 | (2006.01) |
| B01D 71/02 | (2006.01) |
| B01J 20/10 | (2006.01) |
| B01J 20/28 | (2006.01) |
| B01D 69/02 | (2006.01) |
| F17C 11/00 | (2006.01) |

(52) U.S. Cl.
CPC ..... *B01D 67/0046* (2013.01); *B01D 67/0048* (2013.01); *B01D 67/0069* (2013.01); *B01D 69/02* (2013.01); *B01D 69/10* (2013.01); *B01J 20/10* (2013.01); *B01J 20/28004* (2013.01); *B01J 20/28007* (2013.01); *B01J 20/28033* (2013.01); *F17C 11/00* (2013.01); *F17C 11/007* (2013.01); *B01D 2325/04* (2013.01); *B01D 2325/20* (2013.01); *B01D 2325/22* (2013.01); *B01D 2325/28* (2013.01); *B01D 2325/30* (2013.01)

(58) Field of Classification Search
CPC ................ B01D 71/024; B01D 71/027; B01D 2325/04; B01J 20/10; B01J 20/28004; B01J 20/28007; B01J 20/28033
See application file for complete search history.

(56) References Cited

U.S. PATENT DOCUMENTS

| | | | | |
|---|---|---|---|---|
| 2004/0151650 | A1* | 8/2004 | Lange | C01B 33/24 423/331 |
| 2005/0025690 | A1* | 2/2005 | Fukuda | C01B 33/193 423/335 |
| 2007/0154510 | A1* | 7/2007 | Wilcher | A61F 13/00034 424/422 |
| 2008/0070056 | A1* | 3/2008 | Hatanaka | B01D 71/027 428/593 |
| 2013/0059013 | A1* | 3/2013 | Vitale Brovarone | A61L 24/0063 424/602 |
| 2017/0112735 | A1* | 4/2017 | Okada | B01J 20/28004 |

OTHER PUBLICATIONS

Zakhidov et al., "Carbon Structures with Three-Dimensional Periodicity at Optical Wavelenghs", 282 Science (Oct. 30, 1988), pp. 897-901.
Guo et al., "Microporous Decatungstates: Synthesis and Photochemical Behavior", 13 Chem. Mater. (2001), pp. 4058-4064.
Achaw et al., "The evolution of the pore structure of coconut shells during the preparation of coconut shell-based activated carbons", 112 Microporous & Mesoporous Mater. (2008), p. 284-290.
Vilaplana-Ortega et al., "Activated carbon fibre monoliths", 77-78 Fuel Processing Tech. (2002), pp. 445-451.
Hashim et al., "Current status of ceramic-based membranes for oxygen separation from air", 160 Adv. in Colloid & Interlace Sci. (2010), pp. 88-100.
Balachandran et al., "Dense ceramic membranes for partial oxidation of methane to syngas", 133 Appl. Catalysis A: General (1995), pp. 19-29.
Bouwmeester, "Dense ceramic membranes for methane conversion", 82 Catalysis Today (2003), pp. 141-150.
Saha et al., "Adsorption equilibrium and kinetics of $CO_2$, $CH_4$, $N_2O$ and $NH_3$ on ordered mesoporous carbon", 345 J. Colloid & Interface Sci. (2010), pp. 402-409.
Tanaka et al., "Preparation of ordered mesoporous carbon membranes by a soft-templating method", 49 Carbon (2011), pp. 3184-3189.
Mendez-Linan et al., "Carbon Adsorbents from Polycarbonate Pyrolysis Char Residue: Hydrogen and Methane Storage Capacities", 24 Energy Fuels (2010), pp. 3394-3400.

Wan et al., "Ordered Microporous Membranes Templated by Breath Figures for Size-Selective Separation", 134 J. Am. Chem.Soc. (2012), pp. 95-98.
Yunus et al., "A Route to Self-Organized Honeycomb Microstructured Polystyrene Films and Their Chemical Characterization by ToF-SIMS Imaging", 17 Ad. Funct. Mater. (2007), pp. 1079-1084.
Lin et al., "$CO_2$-selective membranes for hydrogen production and $CO_2$ capture—Part I: Membrane development", 457 J. Membr. Sci. (2014), pp. 149-161.
Sachse et al., "Functional silica monoliths with hierarchical uniform porosity as continuous flow catalytic reactors", 140 Microporous and Mesoporous Mater. (2011), pp. 58-68.
Davis et al., "Bacterial templating of ordered macrostructures in silica and silica-surfactant mesophases", 385 Nature (Jan. 30, 1997), pp. 420-423.
Shah et al., "On step in situ synthesis of supported zeolitic imidazolate framework ZIF-8 membranes: Role of sodium formate", 165 Microporous and Mesoporous Mater. (2013), pp. 63-69.
Tokudome et al.,"Synthesis of Monolihic $Al_2O_3$ with Well-Defined Macropores and Mesostructured Skeletons via the Sol-Gel Process Accompanied by Phase Separation", 19 Chem. Mater. (2007), pp. 3393-3398.
Randon et al., "Synthesis of zirconia monoliths for chromatographic separations", 1109 J. Chromatography A (2006), pp. 19-25.
Randon et al., "Zirconia based monoliths used in hydrophilic-interaction chromatography for original selectivity of xanthines", 1217 J. Chromatography (2010), pp. 1496-1500.
Xia et al., "Preparation and the phase transformation behavior of amorphous mesoporous calcium silicate", 108 Microporous and Mesoporous Mater. (2008), pp. 345-351.
Rokita et al., "Transformation of silicate gels during heat treatment in air and in argon—Spectroscopic studies", 1070 J. Malec. Struc. (2014), pp. 125-130.
Radfarnia et al., "Surfactant-Template/Ultrasound-Assisted Method for the Preparation of Porous Nanoparticle Lithium Zirconate", 50 Ind Eng. Chem. Res. (2011), pp. 9295-9305.
Wang et al., "Sonochemical Synthesis of Layered and Hexagonal Yttrium-Zirconium Oxides", 13 Chem. Mater. (2001), pp. 1248-1251.
Brinker et al., "Evaporation-Induced Self-Assembly: Nanostructures Made Easy", 11(7) Adv. Mater. (1999), pp. 579-585.
Yan et al., "Mesoporous bioactive glasses. I. Synthesis and structural characterization", 351 J. Non-Crystalline Solids (2005), pp. 3209-3217.
Banerjee et al., "Control of Pore Size and Functionality in Isoreticular Zeolitic Imidazolate Frameworks and Their Carbon Dioxide Selective Capture Properties", 131 J. Am. Chem. Soc. (2009), pp. 3875-3877.
Carreon et al., "SAPO-34 Seeds and Membranes Prepared Using Multiple Structure Directing Agents", 20 Adv. Mater. (2008), pp. 792-732.
Ashworth, "Relation between gas permselectivity and permeability in a bilayer composite membrane", 71 J. Membrane Sci. (1992), pp. 169-173.
Pan et al., "Synthesis of ceramic hollow fiber supported zeolitic imidazolate framework-8 (ZIF-8) membranes with Hydrogen Permeability", 421-422 J. Membr. Sci. (2012), pp. 292-298.
Wang et al., Recent advances in solid sorbents for $CO_2$ capture and new development trends, 7 Energy Environ. Sci. (2014), pp. 3478-3518.
Blamey et al., "The calcium looping cycle for large-scale $CO_2$ capture", 36 Science (2010), pp. 260-279.
Springuel-Huet et al., "On the roughness of the internal surface of MCM-41 materials studied by 129Xe NMR", 33 Microporous & Mesoporous Mater. (1999), pp. 89-95.
Khayet, "The effects of air gap length on the internal and external morphology of hollow fiber membranes", 58 Chem., Engin, Sci. (2003), pp. 3091-3104.
Xue et al., "Mesoporous calcium silicate for controlled release of bovine serum albumin protein", 5 Acta Biomaterialia (2009), pp. 1686-1696.

(56) References Cited

OTHER PUBLICATIONS

Tian et al., "Synthesis of a SAPO-34 membrane on macroporous supports for high permeance separation of a CO2/CH4 mixture", 10 J. Mater. Chem. (2009), pp. 7698-7703.

Raeissi et al., "Purification of Flue Gas by Ionic Liquids: Carbon Monoxide Capture in [bmim][Tf2N]", 59(10) AIChE (2013), pp. 3886-3891.

Debarge et al., "Rapid thermal oxidation of porous silicon for surface passivation", 1 Mater. Sci. Semiconduc. Proc. 1 (1998), pp. 281-285.

Aoyagi et al., "Basic Properties of Anodized Porous Silicon Formed Under Uniform Current Density", 77(4) Electr. & Comm in Japan, Part 2 (1994), pp. 97-105.

Batrakova et al., "Pluronic block copolymers: Evolution of drug delivery concept from inert nanocarriers to biological response modifiers", 130 J. Controlled Release (2008), pp. 98-106.

Blanazs et al., "Self-Assembled Block Copolymer Aggregates: From Micelles to Vesicles and Their Biological Applications", 30 Macromol. Rapid Commun (2009), pp. 267-277.

\* cited by examiner

POROUS CALCIUM-SILICATES AND METHOD OF SYNTHESIS

STATEMENT REGARDING FEDERALLY SPONSORED RESEARCH OR DEVELOPMENT

This invention was made with government support under Grant No. 1346506, awarded by the National Science Foundation. The government has certain rights in the invention.

CROSS-REFERENCE TO RELATED APPLICATIONS

This invention is based upon and claims the benefit of priority from prior provisional application No. 62/155,591, filed on May 1, 2015.

BACKGROUND OF THE INVENTION

The use of current porous materials as membranes is limited due to the following major drawbacks; 1) chemical instability in acidic media, 2) the gas low flux, 3) large-scale fabrication and manufacturing difficulties, and 4) high cost, etc. The present disclosure addresses such drawbacks with a new invention.

BRIEF SUMMARY OF THE INVENTION

Mesoporous membranes have shown promising separation performance along with a potential to lower the energy consumption, leading to a dramatic cost reduction. Recently, an extensive effort has been made on the design of mesoporous membranes which brought a significant progress toward the synthesis of well-defined porous morphologies, most of which synthesized by utilizing surfactant-template methodology.

Currently, the most well-designed state-of-the-art membranes using this technique are made from metals, polymers, carbon, silica, etc. In the present work, we aim to synthesize mesoporous calcium-silicate particles having superior separation capacity and optimal permeability, thereby leading to reduced energy consumption for selective separation of gases and liquids and/or the combination thereof.

We explore various methods to improve the calcium-silicate membranes properties by tuning pore density (number of pores per unit area) during the synthesis/aging process, while favoring the formation of uniformly distributed hexagonal nanopores. In this context, lowering particle density by controlling calcium to silicon ratio along with optimizing the surface area are essential in achieving our objective.

BRIEF DESCRIPTION OF DRAWINGS

FIG. 3c).

(FIG. 4a) EDX images of C-S with C/S=1.0 (FIG. 4b) Powder-XRD pattern of C-S samples synthesized with C/S=1.0.

DETAILED DECRIPTION OF THE INVENTION

Figure 1:
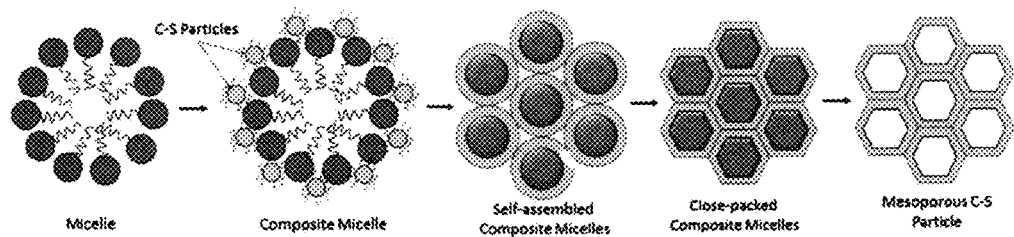
FIG. 1 provides a schematic drawing of the formation mechanism of mesoporous hexagonal C-S membranes.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Introduction

Materials having ordered, monodisperse tunable pores, high specific surface area and excellent adsorption capacity are promising candidates for several applications including biology and medicine,[1] adsorption,[2] catalysis and separations,[3] template assisted growth of nanomaterials,[4] and many more. Among these, separation and storage of gasses have drawn much interest in academia and industry due to the increasing concern over energy sources and global warming. Examples of energy and environment-relevant separation challenges include 1) separation of $CO_2/CH_4$, 2) separation of $H_2$ from $N_2$ or $CH_4$, 3) separation of $O_2$ from air, 4) removal of toxic gases such as $H_2S$ from natural gas, and 5) recovery of $H_2$ in oil refinery processes.[5]

Gas separation by membranes is very energy efficient and cost-effective compared to most competing technologies such as pressure swing adsorption and cryogenic distillation. Key categories of such porous membranes include 1) ceramic based materials[6,7,8]: ceramic based membranes have attracted the tremendous attention for gas separation applications in the last 20 years. The most common ceramic membranes are made of Al, Si, Ti, and Zr oxides, with Ti and Si being more stable than Al or Si oxides. Gas separation using ceramic based materials provides an alternative route to the existing conventional separation processes such as cryogenic distillation and pressure swing adsorption leading to a cheaper production of various gases with high purity. For instance, ceramic membranes made from mixed oxygen-ionic and electronic conducting (MIEC) perovskite oxides can selectively separate oxygen from air at elevated temperatures. Among ceramic membranes with mixed ionic-electronic conducting characteristics, perovskite-type and fluorite-type are the best compounds in case of oxygen permeation properties. Electrosorption ceramic base membranes have been used for the removal of ions from aqueous solutions. The combination of modified microfiltration ceramic based membranes with electrochemically-activated sorption has been used to design new water purification units. Ceramic based membranes offer several unique advantages, such as chemical and thermal stability and rugged structural stability. However, these membranes do not usually provide high adsorption rate along with the sufficient flow rate, 2) carbon-based nano-structured materials[9,10,11]: porous carbon-based materials have attracted increasing interest because of their advantages, such as high surface area, high hydrothermal stability, and chemical inertness. Ordered mesoporous carbon is a promising material in the field of membrane filtration technologies, such as nanofiltration and ultrafiltration. Synthesis of ordered mesoporous carbons have focused on the use of ordered mesoporous silica with interconnected pore structures as hard templates. The pore system of mesoporous carbon is inversely replicated from the silica template, and the carbon usually preserves the morphology of the silica. Thus, the direct control of the mesostructural property and morphology is somewhat impossible 3) organic porous materials[12,13,14]: porous polymers, such as hypercrosslinked polymers, add new merits to the adsorbents family because of their low cost, easy processing, and high chemical stability. The recent decade has witnessed a renaissance in the design and synthesis of porous polymers. They have high chemical stabilities and high specific surface areas (Langmuir surface area of 4650 $m^2 g^{-1}$ for COF-102), and show promising gas storage capacities for clean energy applications. However, they suffer of low thermal stability (150-400° C.), 4) zeolites/silica-based materials[15,16,17]: as a result of limitations associated with organic membranes, inorganic membranes based on zeolitic and silica material have been developed so that the realization of the concept of a catalytic membrane for example for reactors is increasingly possible. Zeolites have been the major materials employed in the fabrication of inorganic membranes for separation/reactive-separation applications and several reviews on their synthesis and applications have been documented in the open literature. Zeolites are tridimensional microporous crystalline aluminosilicates. The crystalline aluminosilicates consist of Si and Al tetrahedral units linked through bridging oxygen atoms giving rise to the so-called secondary building units (SBUs), constituted by rings and prisms of various sizes. These units combine to generate frameworks with a regular distribution of molecular-sized pores and cavities. Comparing zeolite with other porous materials like activated carbon, activated alumina, or silica gel, reveals that pores of zeolites are uniform in sizes determined by their crystal structures. However, there are some drawbacks including chemical instability and low flux of zeolite-based membranes that limit their applicability, 5) other porous inorganic materials[18,19,20] there are other types of inorganic porous materials such as zirconia-based, titania-based and alumina-based monoliths that have only found minor applications due to their numerous drawbacks.

In many cases, the synthetic methodology involves creating the porous structure around a templating agent in order to control pore size or shape. These templates may be organic molecules (including surfactants and polymers), biological molecules and structures or even other inorganic materials. Though considerable progress has been made for porous materials, the high-temperature instability and limited tenability, especially of the organic-based materials, has remained a fundamental challenge. These features are critical for several high temperature applications such as in-situ gas separation technologies and integrated gasification combined cycle (IGCC).

Inorganic porous materials mainly suffer from the following drawbacks 1) chemical instability of aluminum in acidic media, 2) the low flux of most of zeolite-based membranes, 3) large-scale fabrication and manufacturing difficulties, and 4) high cost. The membranes explored here can overcome each of these drawbacks.

Based on the above, the current membranes and technologies used for gas separation and water purification have several drawbacks that limit their usage only to the specific applications and conditions. In the present work, to resolve the abovementioned defects, we propose the calcium-silicate (C-S) mesoporous materials, fabricated by using template-assisted self-assembly technique, as the potential membranes operational for gas separation and purification of water.

Materials and Synthesis

The materials of present technology have drastic departure from the materials used in the currently available membranes. Unlike other newly emerging membrane technologies, which are either based on polymeric or expensive elements, offer limited stability or provide incremental engineering advancements, our project aims at leveraging fundamental science for a breakthrough technology, which is based on two of the most earth-abundant materials, limestone and sand, as key sources of calcium and silicon, respectively. The low prices of calcium and silicon results in a significant cost reduction in provision of initial materials, and thereby considerably reduces the fabrication cost of the C-S membranes comparing to the regular membranes. The synthetic methodology of this technology is uniquely designed to synthesize a new generation of membranes not having the deficiencies of the available state-of-the-art membranes.

The microstructure of C-S is composed of calcium that is connected to silicate chains to form a layered structure. The increased adsorptive capacity of C-S membranes, due to the presence of calcium in their structure, is a substantial feature distinguishing the C-S membranes from other commonly used membranes. Introduction of calcium to the membranes' structure gives base sites, which have an affinity for the molecules of acidic gases such as $CO_2$, leading to high gas separation rate of C-S membranes. It also makes the membrane resists against the elevated temperatures and deleterious agents in aggressive urban or industrial environments.

Synthesis of highly ordered porous structures in complex system such as C-S is a challenge. The difficulty arises due to the heterogeneous nature, the complicated formatting components, and the packing arrangements of several atomic species, which often lead to low symmetry crystals. Note that previous attempts[21] in synthesis of porous C-S have resulted in broad pore size distribution and pseudo-hexagonal pore shapes due to different kinetic conditions and compositions. Such C-S structures are not suitable for high selectivity gas separation. In addition, the amorphous structure or calcination-induced fine crystallinity in the previously reported C-S materials leads to less control over producing highly uniform pores, resulting in a limited gas separation capacity.[22]

To address the aforementioned issue, we recently developed a novel synthetic procedure for obtaining porous C-S particles with highly ordered hexagonal nanopores. Taking an alternative approach, we synthesized C-S membranes with tuned pore size and density by controlling the kinetics and amount of reactants, which resulted in a well-defined mesoporous structure of the membrane. The core of our synthesis is creating a uniform distribution of calcium precursors and orthosilicate around a polymer micelle as a surfactant. The subsequent hydrolysis of the orthosilicate with curing creates a rigid inorganic framework around the micelles, which are removed by the calcination (FIG. 1).

Comparing to the conventional synthesis techniques such as the hydrothermal and co-precipitation, this surfactant-template method is an efficient chemical route, providing highly organized pores with controlled pore edge composition and high surface area.[23,24] The advantages of this technique are (1) simple reaction steps, (2) greater control of pore size, (3) more uniform mixing, (4) lower preparation time, and (5) lower energy usage.

In some embodiments, specific amount of a calcium source, a silicon source, an acidic solution, and deionized $CO_2$-free water can be dissolved in ethanol solution and stirred at room temperature for one hour. Stock solution can be prepared by dissolving a block copolymer in ethanol solution at 40° C. for one hour. Then the main solution can be added to stock solution and stirred together for 3 more hours at 40° C. The resulting sol can be introduced into a polystyrene Petri dish with no cap and transferred into the environmental chamber with the constant temperature of 37° C. to undergo an evaporation-induced self-assembly process.[25,26]

In some embodiments, a remarkable trait of our synthesis method can be evaporation of solvent (ethanol) results in concentration of the nonvolatile surfactant and C-S species in solution. Then, this progressively elevating surfactant concentration can drive the self-assembly of surfactant micelles and their further organization into a liquid crystalline mesophases (FIG. 1). The diameters of micelles can be around a few nanometers and can be adjusted by controlling the surfactant concentration inside solution. The circular micelles with above-mentioned diameters can be closely packed, resulting in arrays of hexagonal micelles with the constricted diameter (FIG. 1).

Figure 2:
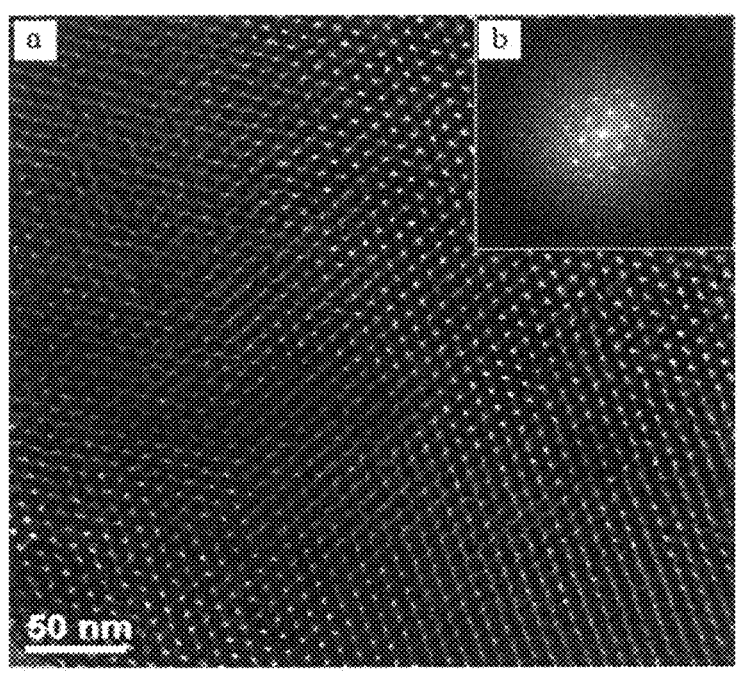
FIG. 2 provides a high resolution TEM (HRTEM) image of mesoporous hexagonal C-S membranes (FIG. 2a) and a selected Area Electron Diffraction patterns (SAED) indicating crystallinity and hexagonal patterns (FIG. 2b).

In some embodiments, after a specific drying duration between 1 to 3 days, the dried gel can be calcined at 650° C. with a rate between 1° C. min$^{-1}$ to 5° C. min$^{-1}$ for a specific time between 1 to 20 hrs to obtain the final porous product in the form of a matrix (FIG. 2a). The microstructure of the synthesized mesoporous materials can be studied by means of the state-of-the-art characterizations instruments as discussed in the next section.

Characterizations

In some embodiments, once mesoporous C-S materials are synthesized, advanced material characterizations can be performed to study the topography, compositions, and porous microstructure. High resolution field emission Scanning Electron Microscopy (SEM) and Transmission Electron Microscopy (TEM) can be used to characterize the crystallinity microstructure of the particles. Under optimal conditions, the TEM can achieve atomic resolution and coupled with SAED pattern studies can distinguish the crystalline phase of the C-S specimens.

In some embodiments, if SAED is not feasible, polycrystalline diffraction patterns in the TEM can be indexed to determine if one or more phases are present. A high resolution TEM (HRTEM) image of the porous structure of the C-S sample along with its Selected Area Electron Diffraction (SAED) patterns are shown in FIG. 2a,b. In some embodiments, the SAED pattern suggests that the C-S structures have long-range orders. This figure can indicate the technical feasibility of our approach to fabricate a controlled microstructure with highly arranged mesopores.

Figure 3:
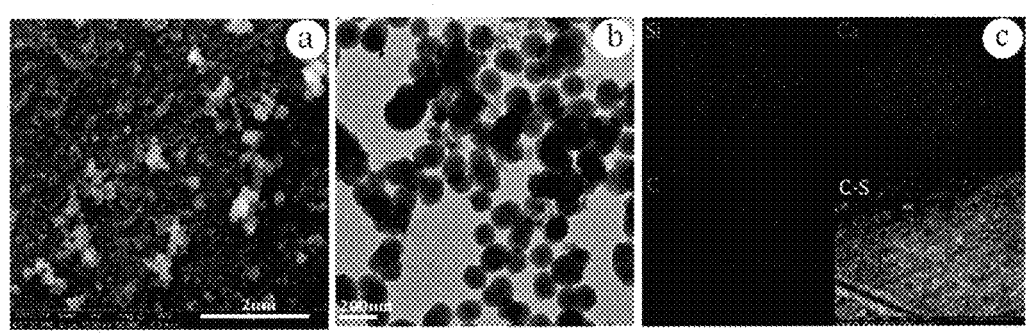
FIG. 3 provides a SEM image of typical mesoporous C-S (FIG. 3a), shows a C-S under TEM (FIG. 3b), and an elemental mapping of C-S microstructure by scanning electron microscopy-energy dispersive X-ray spectrometry (SEM-EDX.

FIG. 3a shows an example of an SEM image of the C-S particles taken at 50 k magnification. As it is observed, conducting the reaction produced a mesoporous matrix which after grinding results in the spherical shape particles with the size less than 200 nanometers. The TEM image shown in FIG. 3b can confirm the size and spherical morphology of the C-S particles. In some embodiments, FIG. 3c shows the elemental analysis and mapping (via Energy-dispersive X-ray spectroscopy) of produced C-S particles. The elemental composition analysis can be used to determine calcium and silicon content and the calcium to silicon (C/S) ratio.

Figure 4:
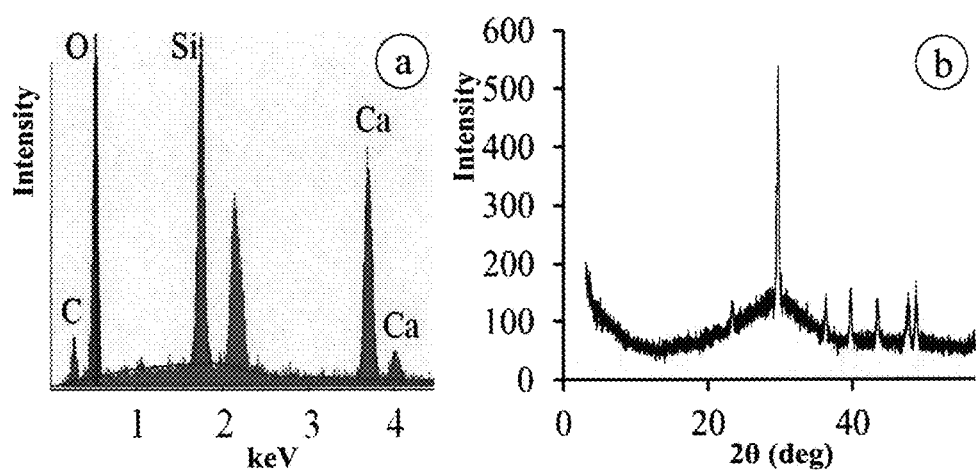
FIG. 4 provides the characterization of the C-S membranes.

In some embodiments, Energy-dispersive X-ray spectroscopy (EDX) can be used for the elemental analysis of the C-S particles (FIG. 4a). In addition, X-ray diffraction (XRD) measurement can be used for the identification of the crystal phases of the synthesized C-S particles (FIG. 4b). The XRD and EDX spectra shown in FIG. 4 correspond to the C-S particles with a specific C/S ratio around 1.

Characteristics of Mesoporous C-S Materials

1. Gas affinity and Selectivity. In some embodiments, using BET, the typical surface area of the C-S structure can be ~700 m$^2$/g and the majority of the pore sizes can be smaller than 6 nm. The gas affinity capacity of mesoporous C-S materials can be measured toward two gases of $CO_2$ and $N_2$. Estimated from slope of adsorption isotherms,[27] it can be found that the $CO_2$ molecules are attracted by C-S materials more than $N_2$ which indicates the higher affinity of $CO_2$ molecules toward C-S materials.

In some embodiments, the coupled affinity-based separation and the geometry regulated (pore size) separation characteristics of C-S materials can be the keys to the success of C-S membranes for $CO_2$ capture and separation. To this, on can add the key advantages of the C-S technology which are higher gas flux, more durability and less fabrication cost.

Figure 5:
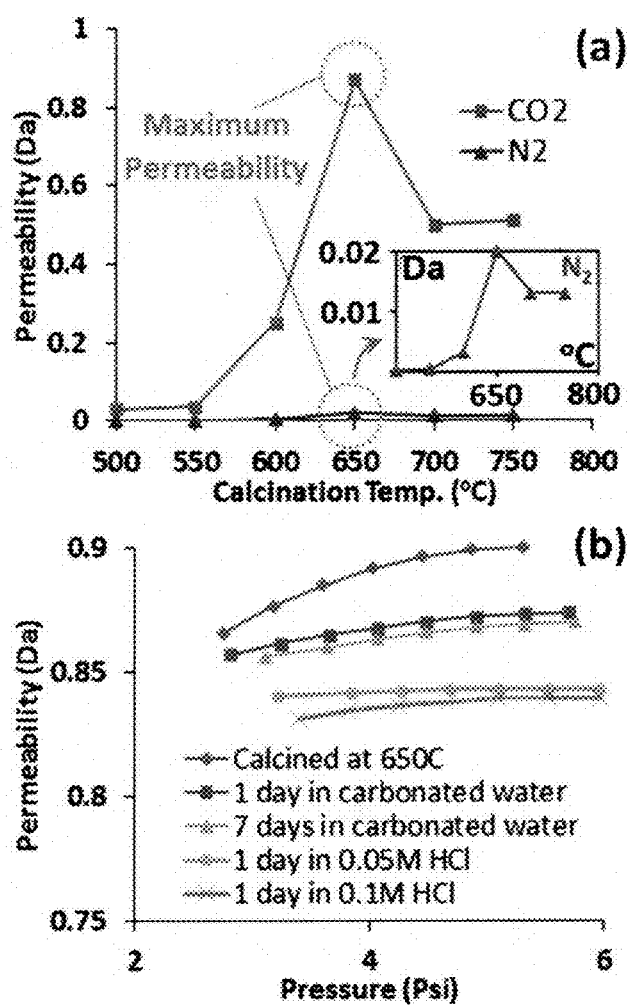
FIG. 5 provides the permeability of the mesoporous C-S materials.

2. Permeability. In some embodiments, high gas flux is a key factor required to boost the separation performance of the membranes. The state-of-the-art membranes such as ZIFs usually exhibit low permeability due to the lower permeance capacity or high thickness of their films—permeability is defined as permeance times the membrane thickness. The gas transport rate increases linearly with decreasing film thickness, thus the thinnest possible layer is required to achieve the highest flux.[28] In some embodiments, using a porometer, the permeability of $CO_2$ and $N_2$ through various C-S membranes calcined can be measured at 500° C. to 750° C. (FIG. 5a). Not surprisingly, the permeation fluxes increased with the partial pressure difference across the membrane. In some embodiments, we found the maximum permeability of the $CO_2$ and $N_2$ gases for the sample calcined at a temperature between 550° C. and 750° C. with the average of 650° C. The permeability of $CO_2$ and $N_2$ through this C-S sample can be around 0.9 and ~0.02 Da, respectively, which translates into permselectivity of $CO_2/N_2$~45; permselectivity is the ratio of the permeability of the more permeable gas ($CO_2$) to that of the less permeable one ($N_2$).[29]

In some embodiments, although the difference in kinetic diameters of $CO_2$ (3.3 Å) and $N_2$ (3.6 Å) is small, this high permselectivity can be the main rational reason towards higher selectivity of $CO_2$ versus $N_2$. In some embodiments, the average permeance of pure $CO_2$ through this sample can be ~152.7×10$^{-7}$ mol/m$^2$·s·Pa, which is significantly higher than that of the ZIF (~5.9×10$^{-7}$ mol/m$^2$·s·Pa), despite the larger thickness of C-S membrane (~2 mm) versus ZIF (~10 μm).[30] This larger permeance can be due to the higher affinity of C-S membranes toward acidic gases ($CO_2$)[31,32] along with their lower roughness on the interior of the pore walls, making them a good candidate for $CO_2$ separation. The inner surface roughness of the pores can be analyzed using atomic force microscopy (AFM) and Solid state Magic Angle Spinning Nuclear Magnetic Resonance ($^{29}$Si MAS NMR).[33,34]

3. Durability. In some embodiments, in view of potential calcium leaching of calcium-based materials in acidic media,[35] we investigated the stability of mesoporous C-S materials in harsh conditions. We measured the permeability of C-S membranes after immersing them for i) 1 day and ii) 7 days in carbonated water, and iii) 1 day in acidic solutions with 2 different HCl concentrations (0.05M & 0.1M). The results can be then compared to the $CO_2$ permeability of the mesoporous C-S materials calcined, for example at 650° C. (FIG. 5b). Interestingly, after exposure to carbonated water and HCl, the permeability of the C-S membranes only decreased slightly while the $CO_2$ flux was still comparable to the control sample and noticeably higher than that of $N_2$. This demonstrates the stable performance and durability of C-S membranes in acidic media.

In some embodiments, the unique characteristics of C-S materials described above, demonstrate the significance of the innovation and strategy to synthesize shape-conttrolled nanopores (for example hexagonal pores) with uniform pore size and structure, which is the first step to design scalable membrane materials with significantly improved selectivity and performance.

Key Advantages of Mesoporous C-S Materials

Our results demonstrate that not only the fabrication of the mesoporous C-S materials is very cost-effective, but also due to the inherent stability and integrity of the inorganic C-S network, C-S materials have high thermal and chemical stability, and could significantly outperform the commercially available membranes in acidic media and high-temperature applications. This leads to increased membrane durability and decreased maintenance and replacement costs. These features, combined with high selectivity make the C-S membranes highly desired for membrane manufacturers to separate gas and/or liquid or any combination thereof. The key advantages of the mesoporus C-S materials are:

1-High Flux and Energy Efficiency. In some embodiments, the permeance of pure $CO_2$ through the compacted mesoporous C-S materials can be significantly higher than the previous reports on membranes with similar pressure, pore size and thickness.[36] Regarding energy efficiency, the higher flux of C-S membranes translates to lower energy usage to separate the same amount of gas compared to less permeable membranes.

2-Significantly Lower Cost. Calcium and silicon are among the most accessible earth-abundant materials. This results in the significant reduction in the cost of initial raw materials required for producing C-S membranes.

3-High Selectivity. In some embodiments, given the very high permselectivity of C-S membranes toward acidic gases, the concentration of permeate gas in the outlet of the membrane can be very high, mainly because of the presence of calcium silicate oxides in the membranes' structure, characterized by calcium connected to silicate chains, which have affinity for acidic gases.[31,32] This implies a very high gas selectivity of the C-S membranes.

4-Increased Durability. In some embodiments, the silicon and calcium network makes the C-S membrane resistant to elevated temperatures and acidic media, leading to the high durability and thus reduced maintenance and replacement costs.

5-Environment Benefits. The C-S membranes significantly reduce the deleterious ecological and environmental impacts of greenhouse gas emissions by capturing and separating greenhouse gases. Furthermore, in some embodiments, the separated and captured $CO_2$ can be used for various applications including production of building materials, carbonated beverage and food processing, medical applications, etc.[37] C-S membranes are also of interest to other industries such as water purification and desalination.

Preparation of C-S Membranes on a Porous Support

Thin porous silicon is already used as an inexpensive substrate in many technologies such as electronic devices.[38] Keeping in track with our high stability, durability, and low-cost goals, in some embodiments, the porous silicon can be utilized as a support for large-scale (several cm) preparation of C-S membranes. In some embodiments, we prepare the thin porous silicon substrates using conventional electrochemical anodization, and tune their thickness/porosity by controlling the duration of the anodization process, the current density, and concentration of electrolyte. Anodization can generate very uniform mesosize pore channels in silicon (e.g., pore channels ~75 nm in diameter with <1% variations).[39] To minimize the time-dependant degradation of substrate, in some embodiments rapid thermal oxidation can be carried out under oxygen flow at 650° C.

Figure 6:
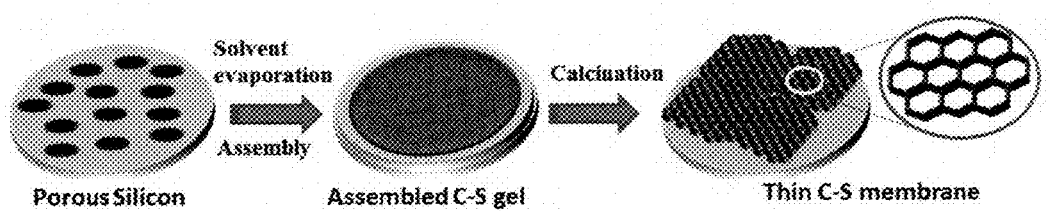
FIG. 6 provides a schematic formation of a thin film of C-S on a porous silicon support.

In some embodiments, as depicted in FIG. 6, a simple way to form a thin stable C-S membrane is to synthesize the C-S material directly (in-situ) on the porous Si substrate. Then, during the aging and calcination process, C-S can conformally fill the pore channels of the support, yielding a mechanically robust film. In some embodiments, the key is to form a cohesive C-S structure and substrate material (Si) with minimal gaps between them; otherwise it will impact negatively the membrane's performance. There are two competing mechanism that must be controlled simultaneously: 1) a small pore diameter in the substrate is ideal since it increases the chance of the C-S structure to attach tightly and conformally to the pore walls, and 2) a very small pore channel may cause high surface tension, inhibiting the C-S gel from penetrating into the pore channels at the initial phase. For the latter mechanism, in some embodiments, the use of vacuum pressure or infiltration can be instrumental to ensure uniform and complete filling of the pore channels.

Discussion

As discussed above, C-S membrane materials are radically different from the standard designs, and are among the most earth-abundant materials, resulting in raw materials cost reduction. In some embodiments, the gas affinity and separation capacity of calcium in the C-S structure is higher than that of many elements in commonly used membranes. The presence of calcium silicate also leads to further sustainability of C-S membranes in harsh conditions such as in corrosive solutions, extreme environments, and/or elevated temperatures. Such properties make C-S membranes a promising candidate for gas and/or liquid separation or any combination thereof.

In some embodiments, we utilized the cutting-edge experimental approaches to control and improve the C-S membrane properties during the synthesis process, and aim for the formation of uniformly distributed shape-controlled mesopores such as hexagonal shapes. In some embodiments, increasing the gas affinity capacity by controlling the C/S ratio along with optimizing the surface area by tuning pore size are essential in achieving our objective.

In some embodiments, through variation of the initial amounts of solvents (i.e. ethanol or water), or surfactant in solution, it is possible to tune the morphology of the mesopores. There are also other variables that control the pore size and density of C-S membranes. For example, in some embodiments, we found that the use of a surfactant template is essential to assemble organized nanopores in C-S materials. Such mesoporous networks form well-ordered arrays: the hexagonal periodicity of the nanopore lattice in obvious from our electron microscopy analysis, as shown in FIG. 2a.

In some embodiments, we found that to minimize the energetically unfavorable water-hydrophobe interactions, the block copolymer amphiphiles can undergo self-assembly in aqueous solution with concentrations above critical micelle concentration (CMC). Thus, the initial surfactant concentration is a significant factor that can be precisely chosen in order to provide the concentration required for self-assembly after solvent evaporation.

In some embodiments, the block copolymer utilized in our reactions, consists of hydrophilic poly-ethylene oxide (PEO) and hydrophobic poly-propylene oxide (PPO) blocks arranged in a complex structure. The block copolymers with different numbers of hydrophilic and hydrophobic units can possess amphiphilic characteristics leading these copolymers display surfactant properties including ability to interact with hydrophobic surfaces and biological membranes.[40,40] The number of blocks in copolymer structure can determine the dimensions of surfactant circular micelles. Since the micelles can turns into pores after calcination, the pore size can be controlled and adjusted to capture smaller gas and/or liquid molecules or any combination thereof by using block copolymers that possess lower number of blocks. In some embodiments, the surfactant is selected from the group consisting of Pluronic® copolymers including F127, F108, F38, F68, F77, F87, P65, P84, P85, P103, P104, P105 and combinations thereof.

In some embodiments, to further increase the self-assembly of block copolymer amphiphiles, magnetically stirred solution is aged in an environmental chamber. Aging time and temperature are the key factors in controlling the crystal size of C-S particles. Because crystal nuclei formation is quickly followed by the particle aggregation, adjusting the above-mentioned factors results in suitable size particles. Long aging time leads to larger C-S particles whereas a short aging time results in impurity of the product.

In some embodiments, smaller C-S particles can be obtained at lower aging temperature because more crystal nuclei can be formed at temperatures below the normal crystallization temperature. Hence, lower aging temperature along with sufficiently long aging time can favor the formation of numerous crystal nuclei. In some embodiments, this strategy can lead to an optimized pore density (number of pores per unit area) of C-S particles, which can improve the separation capability of membrane.

In some embodiments, tuning the chamber humidity is another factor which can optimize the evaporation rate of solvent leading to self-assembly of surfactant micelles, thereby adjusting pore size.

In some embodiments, one of the major reasons for better performance of membranes for size-selective separation is the greater uniformity of the pores across the structure. In some embodiments, maintaining a constant reaction temperature at the critical temperature desirable for crystallization plays a key role in inducing higher pore homogeneity and more uniform distribution, and therefore can leads to a better separation performance.

In some embodiments, the SAED pattern shown in FIG. 2b indicate that the structures are crystalline and confirmed the shape-controlled configuration of the nanopores (for example hexagonal).

Conclusion

The development of C-S-based membranes with improved selectivity and gas separation has a promising future because C-S membranes eliminate the deficiencies of the available state-of-the-art membranes. In the present invention, a low-cost, energy efficient, and chemically/thermally stable C-S membranes with high gas affinity and separation capacity using surfactant-template methodology are synthesized and developed. The isotropic, topologically organized porous structure and high surface area along with corrosion inhibition, and high-temperature resistivity make C-S membranes a promising candidate for separation of gases and/or liquids or any combination thereof.

In some embodiments, effect of several kinetics parameters on tuning the pores structure and density was examined. In some embodiments, C/S ratio was tuned to achieve crystallinity along with the highest gas affinity capacity. In some embodiments, gas adsorption rate and selectivity of C-S membranes were measured using BET analysis.

REFERENCES (1) Kerry, F. G. *Industrial gas handbook: gas separation and purification*; CRC Press, 2007.
(2) Zakhidov, A. A.; Baughman, R. H.; Iqbal, Z.; Cui, C.; Khayrullin, I.; Dantas, S. O.; Marti, J.; Ralchenko, V. G. Carbon structures with three-dimensional periodicity at optical wavelengths. *Science* 1998, 282 (5390), 897.
(3) Guo, Y.; Hu, C.; Wang, X.; Wang, Y.; Wang, E.; Zou, Y.; Ding, H.; Feng, S. Microporous decatungstates: synthesis and photochemical behavior. *Chemistry of materials* 2001, 13 (11), 4058.
(4) Achaw, O.-W.; Afrane, G. The evolution of the pore structure of coconut shells during the preparation of coconut shell-based activated carbons. *Microporous and Mesoporous Materials* 2008, 112 (1), 284.
(5) Vilaplana-Ortego, E.; Alcañiz-Monge, J.; Cazorla-Amorós, D.; Linares-Solano, A. Activated carbon fibre monoliths. *Fuel Processing Technology* 2002, 77, 445.
(6) Hashim, S. M.; Mohamed, A. R.; Bhatia, S. Current status of ceramic-based membranes for oxygen separation from air. *Advances in colloid and interface science* 2010, 160 (1), 88.
(7) Balachandran, U.; Dusek, J.; Mieville, R. L.; Poeppel, R.; Kleefisch, M.; Pei, S.; Kobylinski, T.; Udovich, C.; Bose, A. Dense ceramic membranes for partial oxidation of methane to syngas. *Applied Catalysis A: General* 1995, 133 (1), 19.
(8) Bouwmeester, H. J. Dense ceramic membranes for methane conversion. *Catalysis Today* 2003, 82 (1), 141.
(9) Saha, D.; Deng, S. Adsorption equilibrium and kinetics of $CO_2$, $CH_4$, $N_2O$, and $NH_3$ on ordered mesoporous carbon. *Journal of colloid and interface science* 2010, 345 (2), 402.
(10) Tanaka, S.; Nakatani, N.; Doi, A.; Miyake, Y. Preparation of ordered mesoporous carbon membranes by a soft-templating method. *Carbon* 2011, 49 (10), 3184.
(11) Méndez-Liñán, L.; López-Garzón, F. J.; Domingo-García, M. a.; Pérez-Mendoza, M. Carbon Adsorbents from Polycarbonate Pyrolysis Char Residue: Hydrogen and Methane Storage Capacities†. *Energy & Fuels* 2010, 24 (6), 3394.

(12) Wan, L.-S.; Li, J.-W.; Ke, B.-B.; Xu, Z.-K. Ordered microporous membranes templated by breath figures for size-selective separation. *Journal of the American Chemical Society* 2011, 134 (1), 95.
(13) Yunus, S.; Delcorte, A.; Poleunis, C.; Bertrand, P.; Bolognesi, A.; Botta, C. A Route to Self-Organized Honeycomb Microstructured Polystyrene Films and Their Chemical Characterization by ToF-SIMS Imaging. *Advanced Functional Materials* 2007, 17 (7), 1079.
(14) Lin, H.; He, Z.; Sun, Z.; Vu, J.; Ng, A.; Mohammed, M.; Kniep, J.; Merkel, T. C.; Wu, T.; Lambrecht, R. C. CO 2-selective membranes for hydrogen production and CO 2 Capture—Part I: Membrane development. *Journal of Membrane Science* 2014, 457, 149.
(15) Sachse, A.; Galarneau, A.; Fajula, F.; Di Renzo, F.; Creux, P.; Coq, B. Functional silica monoliths with hierarchical uniform porosity as continuous flow catalytic reactors. *Microporous and Mesoporous Materials* 2011, 140 (1), 58.
(16) Davis, S. A.; Burkett, S. L.; Mendelson, N. H.; Mann, S. Bacterial templating of ordered macrostructures in silica and silica-surfactant mesophases. 1997.
(17) Shah, M.; Kwon, H. T.; Tran, V.; Sachdeva, S.; Jeong, H.-K. One step in situ synthesis of supported zeolitic imidazolate framework ZIF-8 membranes: Role of sodium formate. *Microporous and Mesoporous Materials* 2013, 165, 63.
(18) Tokudome, Y.; Fujita, K.; Nakanishi, K.; Miura, K.; Hirao, K. Synthesis of monolithic Al2O3 with well-defined macropores and mesostructured skeletons via the sol-gel process accompanied by phase separation. *Chemistry of materials* 2007, 19 (14), 3393.
(19) Randon, J.; Huguet, S.; Piram, A.; Puy, G.; Demesmay, C.; Rocca, J.-L. Synthesis of zirconia monoliths for chromatographic separations. *Journal of chromatography A* 2006, 1109 (1), 19.
(20) Randon, J.; Huguet, S.; Demesmay, C.; Berthod, A. Zirconia based monoliths used in hydrophilic-interaction chromatography for original selectivity of xanthines. *Journal of Chromatography A* 2010, 1217 (9), 1496.
(21) Xia, W.; Chang, J. Preparation and the phase transformation behavior of amorphous mesoporous calcium silicate. *Microporous and Mesoporous Materials* 2008, 108 (1), 345.
(22) Rokita, M.; Mozgawa, W.; Adamczyk, A. Transformation of silicate gels during heat treatment in air and in argon-spectroscopic studies. *Journal of Molecular Structure* 2014, 1070, 125.
(23) Radfarnia, H. R.; Iliuta, M. C. Surfactant-Template/Ultrasound-Assisted Method for the Preparation of Porous Nanoparticle Lithium Zirconate. *Industrial & Engineering Chemistry Research* 2011, 50 (15), 9295.
(24) Wang, Y.; Yin, L.; Palchik, O.; Hacohen, Y. R.; Koltypin, Y.; Gedanken, A. Sonochemical Synthesis of Layered and Hexagonal Yttrium-Zirconium Oxides. *Chemistry of Materials* 2001, 13 (4), 1248.
(25) Brinker, C. J.; Lu, Y.; Sellinger, A.; Fan, H. Evaporation-induced self-assembly: nanostructures made easy. *Advanced materials* 1999, 11 (7), 579.
(26) Yan, X.; Deng, H.; Huang, X.; Lu, G.; Qiao, S.; Zhao, D.; Yu, C. Mesoporous bioactive glasses. I. Synthesis and structural characterization. *Journal of non-crystalline solids* 2005, 351 (40), 3209.
(27) Banerjee, R.; Furukawa, H.; Britt, D.; Knobler, C.; O'Keeffe, M.; Yaghi, O. M. Control of pore size and functionality in isoreticular zeolitic imidazolate frameworks and their carbon dioxide selective capture properties. *Journal of the American Chemical Society* 2009, 131 (11), 3875.
(28) Carreon, M. A.; Li, S.; Falconer, J. L.; Noble, R. D. SAPO-34 Seeds and Membranes Prepared Using Multiple Structure Directing Agents. *Advanced Materials* 2008, 20 (4), 729.
(29) Ashworth, A. J. Relation between gas permselectivity and permeability in a bilayer composite membrane. *Journal of Membrane Science* 1992, 71 (1-2), 169.
(30) Pan, Y.; Wang, B.; Lai, Z. Synthesis of ceramic hollow fiber supported zeolitic imidazolate framework-8 (ZIF-8) membranes with high hydrogen permeability. *Journal of Membrane Science* 2012, 421-422 (0), 292.
(31) Wang, J.; Huang, L.; Yang, R.; Zhang, Z.; Wu, J.; Gao, Y.; Wang, Q.; O'Hare, D.; Zhong, Z. Recent advances in solid sorbents for CO2 capture and new development trends. *Energy & Environmental Science* 2014, 7 (11), 3478.
(32) Blamey, J.; Anthony, E. J.; Wang, J.; Fennell, P. S. The calcium looping cycle for large-scale CO2 capture. *Progress in Energy and Combustion Science* 2010, 36 (2), 260.
(33) Springuel-Huet, M.-A.; Sun, K.; Fraissard, J. On the roughness of the internal surface of MCM-41 materials studied by 129 Xe NMR. *Microporous and mesoporous materials* 1999, 33 (1), 89.
(34) Khayet, M. The effects of air gap length on the internal and external morphology of hollow fiber membranes. *Chemical engineering science* 2003, 58 (14), 3091.
(35) Xue, W.; Bandyopadhyay, A.; Bose, S. Mesoporous calcium silicate for controlled release of bovine serum albumin protein. *Acta biomaterialia* 2009, 5 (5), 1686.
(36) Tian, Y.; Fan, L.; Wang, Z.; Qiu, S.; Zhu, G. Synthesis of a SAPO-34 membrane on macroporous supports for high permeance separation of a CO 2/CH 4 mixture. *Journal of Materials Chemistry* 2009, 19 (41), 7698.
(37) Raeissi, S.; Florusse, L. J.; Peters, C. J. Purification of flue gas by ionic liquids: Carbon monoxide capture in [bmim][Tf2N]. *AIChE Journal* 2013, 59 (10), 3886.
(38) Debarge, L.; Stoquert, J.; Slaoui, A.; Stalmans, L.; Poortmans, J. Rapid thermal oxidation of porous silicon for surface passivation. *Materials Science in semiconductor processing* 1998, 1 (3), 281.
(39) Aoyagi; Motohashi, A.; Kinoshita, A. Basic Properties of Anodized Porous Silicon Formed under Uniform Current Density. *Electronics and Communications in Japan* 1994, 77 (2), 722.
(40) Batrakova, E. V.; Kabanov, A. V. Pluronic block copolymers: evolution of drug delivery concept from inert nanocarriers to biological response modifiers. *Journal of Controlled Release* 2008, 130 (2), 98.
(41) Blanazs, A.; Armes, S. P.; Ryan, A. J. Self-assembled block copolymer aggregates: from micelles to vesicles and their biological applications. *Macromolecular Rapid Communications* 2009, 30 (4-5), 267.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of separating gases utilizing porous calcium-silicate particles, the method comprising:
    synthesizing porous calcium-silicate particles by mixing a calcium source with a silicate source, wherein the mixing occurs in the presence of a surfactant and a solvent and wherein the mixing results in formation of the porous calcium-silicate materials;
    forming a membrane from the porous calcium-silicate materials; and
    separating a gas by passing the gas across the membrane.

2. The method of claim 1, wherein the surfactant is a block copolymer consisting of poly-ethylene oxide (PEO) and hydrophobic poly-propylene oxide (PPO) blocks.

3. The method of claim 1, wherein the solvent is selected from the group consisting of water, acetone, ethanol, methanol, isopropyl alcohol, acetonitrile, and combinations thereof.

4. The method of claim 1, wherein the calcium source is selected from the group of calcium salts consisting of, calcium nitrate, calcium carbonate, calcium hydroxide, calcium chloride, and combinations thereof.

5. The method of claim 1, wherein the silicate source is selected from the group consisting of tetraethyl orthosilicate, sodium silicates, sodium metasilicate pentahydrate, silica, and combinations thereof.

6. The method of claim 1, wherein the surfactant is mixed with a solvent and then is mixed with a solution comprising other solvents, an acidic solution, calcium source and silicon source after a predetermined time.

7. The method of claim 6, wherein the solution is aged and cured at a predetermined temperature for less than 1 day, 1 day, between 1 day and 2 days, 2 days, more than 2 days, or a combination thereof to go under evaporation-induced self-assembly.

8. The method of claim 6, wherein the surfactant is removed from the solution by calcination for a predetermined time at a predetermined temperature or by washing with solvent for a predetermined time.

9. The method of claim 1, further comprising a step of controlling the porous structure of the calcium-silicate materials, wherein the controlling comprises at least one of selecting the solvent, selecting the solvent volume, selecting the calcium source, selecting the silicate source, selecting the surfactant, selecting the surfactant volume, selecting an aging and curing time, selecting an aging and curing temperature, selecting a calcination time, selecting a calcination temperature, selecting a stoichiometric ratio of the calcium source over the silicate source which is at least one of less than 1.0, 1.0, between 1 and 1.5, 1.5, between 1.5 and 2, 2.0, or greater than 2.0, adjusting a gas flow during the reaction, adjusting the reaction pH, and combinations thereof.

10. The method of claim 1, wherein the pores in calcium-silicate materials are in the scales of sub-nanosize, nanosize, microsize, and/or combinations thereof.

11. The method of claim 1, wherein the pores are in the form of hexagonal shapes, circular shapes, rectangular shapes, oval shapes, irregular shapes, and combinations thereof.

12. The method of claim 1, wherein the formed calcium-silicate materials are ground in the form of nanoparticles, microparticles, and combinations thereof with spherical shapes, oval shapes, rod-like shapes, sheet-like shapes, rectangular shapes, cubic shapes, rhombohedra shapes, agglomerated dendritic shapes, irregular shapes, and combination thereof.

13. The method of claim 1, wherein the calcium-silicate particles' size is at least one of less than 50 nm, 50 nm, between 50 nm and 100 nm, 100 nm, between 100 nm and 200 nm, 200 nm, between 200 and 250 nm, 250 nm, between 250 nm and 300 nm, 300 nm, between 300 and 400 nm, 400 nm, between 400 nm and 500 nm, and combinations thereof.

14. The method of claim 1, wherein separating a gas comprises separating of $H_2$ from $N_2$ or $CH_4$.

15. The method of claim 1, wherein separating a gas comprises separating of $O_2$ from air.

16. The method of claim 1, wherein separating a gas comprises removing toxic gases from natural gas.

17. The method of claim 1, wherein separating a gas comprises recovery of $H_2$ in an oil refinery process.

18. The method of claim 1, wherein separating a gas comprises separating $CO_2$ or $CH_4$.

19. The method of claim 1, wherein separating a gas comprises separating acidic gases.

* * * * *